United States Patent
Wagle et al.

(10) Patent No.: US 10,557,071 B2
(45) Date of Patent: *Feb. 11, 2020

(54) NANOSILICA DISPERSION WELL TREATMENT FLUID

(71) Applicant: Saudi Arabian Oil Company, Dhahran (SA)

(72) Inventors: Vikrant Wagle, Abqaiq (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,233

(22) Filed: Apr. 24, 2017

(65) Prior Publication Data
US 2018/0223149 A1    Aug. 9, 2018

Related U.S. Application Data

(60) Provisional application No. 62/454,253, filed on Feb. 3, 2017.

(51) Int. Cl.
| | |
|---|---|
| *C09K 8/035* | (2006.01) |
| *C09K 8/03* | (2006.01) |
| *E21B 33/138* | (2006.01) |
| *E21B 21/00* | (2006.01) |
| *C09K 8/504* | (2006.01) |
| *C09K 8/506* | (2006.01) |

(52) U.S. Cl.
CPC .............. *C09K 8/032* (2013.01); *C09K 8/035* (2013.01); *C09K 8/506* (2013.01); *C09K 8/5045* (2013.01); *E21B 21/003* (2013.01); *E21B 33/138* (2013.01); *C09K 2208/08* (2013.01); *C09K 2208/10* (2013.01)

(58) Field of Classification Search
CPC ............ C09K 2208/08; C09K 2208/10; C09K 8/032; C09K 8/035; C09K 8/5045; C09K 8/506; E21B 21/003; E21B 33/138
See application file for complete search history.

(56) References Cited

U.S. PATENT DOCUMENTS

| | | | |
|---|---|---|---|
| 3,342,747 | A | 9/1967 | Mindick et al. |
| 4,054,536 | A | 10/1977 | Schaefer et al. |

(Continued)

FOREIGN PATENT DOCUMENTS

| | | |
|---|---|---|
| EP | 1114794 A1 | 7/2001 |
| WO | WO2007135617 A1 | 11/2007 |
| WO | 2015041703 A1 | 3/2015 |

OTHER PUBLICATIONS

Yoda, S. et al.; "Effects of ethanolamines catalysts on properties and microstructures of silica aerogels" Journal of Non-Crystalline Solids, vol. 208 (1996); pp. 191-198.

(Continued)

*Primary Examiner* — Alicia Bland
(74) *Attorney, Agent, or Firm* — Bracewell LLP; Constance G. Rhebergen; Brian H. Tompkins

(57) ABSTRACT

A well treatment fluid is provided having an acidic nanosilica dispersion. The nanosilica dispersion of well treatment fluid may form a gelled solid after interaction with a formation over a period. Methods of reducing water production using the well treatment fluids are also provided.

6 Claims, 3 Drawing Sheets

(56) References Cited

U.S. PATENT DOCUMENTS

| | | | |
|---|---|---|---|
| 4,732,213 A * | 3/1988 | Bennett | C09K 8/50 |
| | | | 166/275 |
| 5,320,171 A | 6/1994 | Laramay | |
| 5,327,968 A | 7/1994 | Onan et al. | |
| 5,807,810 A | 9/1998 | Blezard et al. | |
| 5,836,390 A * | 11/1998 | Apps | C09K 17/12 |
| | | | 166/281 |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 * | 6/2011 | Lende | C04B 28/02 |
| | | | 166/293 |
| 9,045,965 B2 | 6/2015 | Patil et al. | |
| 9,133,386 B2 | 9/2015 | Kumar et al. | |
| 2003/0139297 A1 | 7/2003 | Quintero | |
| 2004/0031611 A1 | 2/2004 | Huang et al. | |
| 2005/0284666 A1 | 12/2005 | Cowan | |
| 2007/0034410 A1 * | 2/2007 | Xiang | C09K 8/145 |
| | | | 175/65 |
| 2008/0066909 A1 | 3/2008 | Hutchins et al. | |
| 2011/0094746 A1 | 4/2011 | Allison et al. | |
| 2011/0162845 A1 | 7/2011 | Ravi et al. | |
| 2012/0012317 A1 * | 1/2012 | Putzig | C08B 37/0096 |
| | | | 166/285 |
| 2012/0073813 A1 | 3/2012 | Zamora et al. | |
| 2013/0292120 A1 * | 11/2013 | Patil | E21B 33/13 |
| | | | 166/293 |
| 2014/0158354 A1 * | 6/2014 | Kumar | E21B 21/003 |
| | | | 166/293 |
| 2014/0174739 A1 | 6/2014 | Bourcier et al. | |
| 2014/0349894 A1 | 11/2014 | Quintero et al. | |
| 2014/0353042 A1 | 12/2014 | Karale et al. | |
| 2016/0107938 A1 | 4/2016 | Mäder et al. | |
| 2017/0292056 A1 | 10/2017 | Wagle et al. | |

OTHER PUBLICATIONS

International Search Report and Written Opinion for International Application No. PCT/US2018/016331; International Filing Date Feb. 1, 2018; Report dated Apr. 13, 2018 (pp. 1-12).

International Search Report and Written Opinion for International Application No. PCT/US2018/016333; International Filing Date Feb. 1, 2018; Report dated Apr. 12, 2018 (pp. 1-14).

International Search Report and Written Opinion for International Application No. PCT/US2018/016334; International Filing Date Feb. 1, 2018; Report dated Apr. 13, 2018 (pp. 1-14).

International Search Report and Written Opinion for International Application No. PCT/US2018/016335; International Filing Date Feb. 1, 2018; Report dated Mar. 29, 2018 (pp. 1-11).

* cited by examiner

NANOSILICA DISPERSION WELL TREATMENT FLUID

CROSS-REFERENCE TO RELATED APPLICATIONS

This application claims priority from U.S. Provisional Application No. 62/454,253 filed Feb. 3, 2017, and titled "NANOSILICA DISPERSION LOST CIRCULATION MATERIAL (LCM) AND WELL TREATMENT FLUID." For purposes of United States patent practice, this application incorporates the contents of the Provisional Application by reference in its entirety.

BACKGROUND

Field of the Disclosure

The present disclosure generally relates to controlling lost circulation in a well during drilling with a drilling fluid and reducing water production during production from the well. More specifically, embodiments of the disclosure relate to lost circulation materials (LCMs) and well treatment fluids.

Description of the Related Art

Various challenges are encountered during drilling and production operations of oil and gas wells. For example, fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor losses (for example less than 10 barrels/hour ((bbl/hr), also referred to as seepage loss, to severe (for example, greater than 100 bbl/hr), or higher, also referred to referred to as complete fluid loss. As a result, the service provided by such fluid is more difficult or costly to achieve.

Such lost circulation can be encountered during any stage of operations and occurs when drilling fluid (or drilling mud) pumped into a well returns partially or does not return to the surface. While de minimis fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

In another example, after a well is completed and becomes a producing well, water production from the well may cause significant economic drawbacks. High water production rates may cause a reduction in well productivity, an increase operating expenditures, and can completely block production from wells. Consequently, controlling and eliminating unwanted water influx into oil or gas wells is a major concern of producers. The water produced in a well may be the result of a water-producing zone communicating with the oil or gas producing zone by fractures, high-permeability streaks, fissures, vugs, or the like. Water production may also be caused by occurrences such as water coning, water cresting, bottom water, and channeling at the wellbore. Such water production is typically produced at the expense of oil or gas recovery, and, in severe cases, the water influx may be so great that oil or gas production is choked off completely.

SUMMARY

Lost circulation materials (LCMs) are used to mitigate lost circulation by blocking the path of the drilling mud into the formation. The type of LCM used in a lost circulation situation depends on the extent of lost circulation and the type of formation. Lost circulation materials may be classified into different categories, such as fibrous materials, flaky materials, granular materials, gel type materials, crosslinking polymers, and loss control slurries. Such materials are frequently used either alone or in combination to control loss of circulation. The costs incurred in lost circulation situations may be due to lost time, losses of drilling fluids, and losses of production. Existing LCMs may perform poorly in mitigation and prevention of moderate lost circulation and seepage type lost circulation, and may not be suitable for controlling severe loss of circulation. Costs incurred in loss circulation situations may be due to losses of drilling fluids, losses of production, and the costs of LCMs.

In enhanced recovery techniques such as water flooding, an aqueous flood or displacement fluid is injected under pressure into an oil-containing subterranean formation by way of one or more injection wells. The flow of the aqueous fluid through the formation displaces oil or gas and drives it to one or more producing wells. However, the aqueous displacement fluid tends to flow through the most permeable zones in the subterranean formation such that less permeable zones containing oil or gas are bypassed. This uneven flow of the aqueous displacement fluid through the formation reduces the overall yield of hydrocarbons from the formation. Enhanced recovery problems caused by permeability variations in subterranean formations have been corrected by reducing the permeability of the subterranean formation flow paths. The techniques utilized to accomplish this reduction in the permeability of high permeability zones are may be referred to as "conformance control techniques." Decreasing excess water production increases the production water/oil ratio ("WOR"), thus lowering water-handling cost. As oil production increases and water production decreases, conformance control techniques can extend a well's economic life and increase return on investment (ROI). Existing techniques for controlling water production in subterranean formations include the use of gelatin-forming polymers, concrete resin barriers, and hydrophilic polymers. However, existing techniques may be unstable at high temperatures or in the presence of certain chemicals (for example, acids and brines), resulting in decomposition or degradation and reducing or eliminating their effectiveness. Moreover, some polymers used for controlling water production may be environmentally damaging.

In one embodiment, a method to reduce water production in a treatment zone in a wellbore is provided that includes introducing a treatment fluid into the wellbore such that the treatment fluid contacts the treatment zone and reduces the water production in the treatment zone. The treatment fluid consists of a nanosilica dispersion. In some embodiments, the acidic nanosilica dispersion includes amorphous silicon dioxide in the range of 5 weight percentage of the total weight (w/w %) to about 50 w/w %. In some embodiments, the acidic nanosilica dispersion includes water in the range of 50 w/w % to 95 w/w %. In some embodiments, the treatment zone is located in a carbonate formation. In some embodiments, the method includes maintaining the acidic nanosilica dispersion in contact with the treatment zone for a period, such that the acidic nanosilica dispersion forms a gelled solid. In some embodiments, the period is a range of 0.5 hours to 24 hours.

In another embodiment, a solid gelled material useful for reducing water production is provided. The solid gelled material includes the reaction product of amorphous silicon dioxide and glycerin in water, such that the solid gelled material forms by introducing a nanosilica dispersion to a treatment zone. The acidic nanosilica dispersion includes amorphous silicon dioxide in the range of 5 weight percentage of the total weight (w/w %) to about 50 w/w %, and water in the range of 50 w/w % to 95 w/w %. In such embodiments, the acidic nanosilica dispersion contacts the treatment zone having an elevated temperature for a period such that the solid gelled material forms. In some embodiments, the acidic nanosilica dispersion has a pH that is acidic. In some embodiments, the treatment zone is carbonate. In some embodiments, the acidic nanosilica dispersion has a pH value that is reduced at introduction and a greater pH value upon contact with the carbonate lost circulation zone.

In another embodiment, a method to reduce water production in a treatment zone in a wellbore is provided that includes introducing a treatment fluid into the wellbore such that the treatment fluid contacts the treatment zone and reduces the water production in the treatment zone. The treatment fluid consists of a nanosilica dispersion and at least one of: calcium carbonate particles, fibers, mica, and graphite. In some embodiments, the fibers include at least one of: polyester fibers, polypropylene fibers, starch fibers, polyketone fibers, ceramic fibers, glass fibers or nylon fibers.

DETAILED DESCRIPTION

Figure 1:
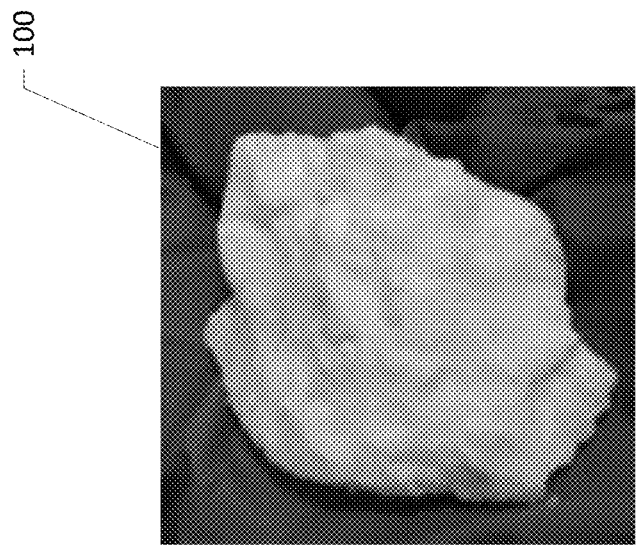
FIG. 1 is a photograph of a gelled solid formed by a mixture of a nanosilica dispersion with added calcium carbonate in accordance with an embodiment of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a nanosilica dispersion LCM for carbonate formations to mitigate or prevent lost circulation in a well, as well as provide seepage control and minimize or prevent fluid loss. In some embodiments, the nanosilica dispersion may include amorphous silicon dioxide in the range of about 5 weight percentage of the total weight (w/w %) of the nanosilica dispersion to about 50 w/w %, glycerin in the range of about 3 w/w % to about 5 w/w %, and water in the range of about 50 w/w % to about 95 w/w %. It should be appreciated that other suitable nanosilica dispersions may not include glycerin. In some embodiments, the nanosilica dispersion may be an acidic nanosilica dispersion and may have a pH of less than 7 before interaction with a formation. The nanosilica dispersion LCM may be introduced into a lost circulation zone in a wellbore, such that the nanosilica dispersion LCM alters the lost circulation zone. The nanosilica dispersion LCM may be allowed to interact with the lost circulation zone for a period to enable the in-situ formation of a gelled solid as a result of the interaction between the nanosilica dispersion and the carbonate formation.

Embodiments of the disclosure also include a nanosilica dispersion and an alkanolamine activator LCM to mitigate or prevent lost circulation in a well, as well as provide seepage control and minimize or prevent fluid loss. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the alkanolamine activator may be monoethanolamine. In some embodiments, the nanosilica dispersion may be an acidic nanosilica dispersion and may have a pH of less than 7 before interaction with the activator. The nanosilica dispersion and alkanolamine activator LCM may be introduced into a lost circulation zone in a wellbore, such that the nanosilica dispersion and alkanolamine activator LCM alters the lost circulation zone. The nanosilica dispersion and alkanolamine activator LCM may be allowed to interact with the lost circulation zone for a period to enable the in-situ formation of a gelled solid as a result of the interaction between the nanosilica dispersion and the alkanolamine activator.

Embodiments of the disclosure additionally include a nanosilica dispersion treatment fluid for carbonate formations to reduce or block water production such as, for example, a result of water flooding operations for a producing well. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion may be an acidic nanosilica dispersion and may have a pH of less than 7 before interaction with a formation. In some embodiments, the nanosilica dispersion may be introduced into a treatment zone of a well, such as by pumping through a wellhead at a pump rate sufficient to position the well treatment fluid at the treatment zone. The treatment fluid may be allowed to interact with the treatment zone for a period to enable the in-situ reaction between the nanosilica dispersion and the carbonate formation that forms the gelled solid.

Embodiments of the disclosure further include a nanosilica dispersion and an alkanolamine activator treatment fluid to reduce or block water production such as, for example, a result of water flooding operations for a producing well. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the alkanolamine activator may be monoethanolamine. In some embodiments, the nanosilica dispersion may be an acidic nanosilica dispersion and may have a pH of less than 7 before interaction with the activator. In some embodiments, the treatment fluid may be introduced into a treatment zone of a well, such as by pumping through a wellhead at a pump rate sufficient to position the treatment fluid at the treatment zone. The treatment fluid may be allowed to interact with the treatment zone for a period to enable the in-situ formation of a gelled solid as a result of the interaction between the nanosilica dispersion and the alkanolamine activator.

Nanosilica Dispersion LCM

In some embodiments, an LCM for a carbonate formation includes a nanosilica dispersion. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion may be an acidic nanosilica dispersion and may have a pH of less than 7 before interaction with a formation. In some embodiments, the nanosilica dispersion includes a stabilizer of acetic acid. In some embodiments, the nanosilica dispersion has a pH in the range of 2 to 4 at 25° C., a specific gravity of 1.21 (g/ml) a viscosity of less than 30 cP at 25° C. In some embodiments, the nanosilica dispersion may be obtained from Evonik Corporation of Parsippany, N.J., USA.

In some embodiments, the nanosilica dispersion LCM may include additional materials. For example, in some embodiment the nanosilica dispersion LCM may include calcium carbonate particles, fibers (such as polyester fibers, polypropylene fibers, starch fibers, polyketone fibers, ceramic fibers, glass fibers or nylon fibers), mica, graphite, or combinations thereof.

In some embodiments, the nanosilica dispersion and alkanolamine activator LCM may be allowed to interact with the lost circulation zone for a period. For example, the period may be of sufficient duration to enable formation of a gelled solid as a result of the interaction between the nanosilica dispersion and the alkanolamine activator. The formed gelled solid may alter the lost circulation zone (for example, by entering and blocking porous and permeable paths, cracks, and fractures in a formation in the lost circulation zone, such as forming a structure in a mouth or within a fracture). In some embodiments, the interaction period may be in the range of about 0.5 hours to about 24 hours.

As shown supra, the nanosilica dispersion may form a gelled solid when in contact with calcium carbonate of a formation of a well. Upon introduction of the nanosilica dispersion with the carbonate formation, the pH of the nanosilica dispersion may increase (due to reaction of an acid of the dispersion with the carbonate formation) and become alkaline. Additionally, the delayed and controlled gelling of the nanosilica dispersion LCM may provide for easier pumping of the LCM. The nanosilica dispersion LCM may be used at elevated temperatures in a wellbore such as, for example, 100° F. or greater, such as 300° F. Moreover, the environmentally friendly properties of the nanosilica dispersion LCM may minimize or prevent any environmental impact and effect on ecosystems, habitats, population, crops, and plants at or surrounding the drilling site where the acidic nanosilica dispersion LCM is used.

Nanosilica Dispersion and Alkanolamine Activator LCM

In some embodiments, an LCM for a carbonate formation includes a nanosilica dispersion and an alkanolamine activator. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion includes a stabilizer of acetic acid. In some embodiments, the nanosilica dispersion may be an acidic nanosilica dispersion and may have a pH of less than 7 before interaction with the activator. In some embodiments, the nanosilica dispersion has a pH in the range of 2 to 4 at 25° C., a specific gravity of 1.21 (g/ml) a viscosity of less than 30 cP at 25° C. In some embodiments, the nanosilica dispersion may be obtained from Evonik Corporation of Parsippany, N.J., USA.

In some embodiments, the alkanolamine activator may include monoethanolamine. In other embodiments, the alkanolamine activator may include other alkanolamines, such as diethanolamine, triethanolamine, and their derivatives. In some embodiments, the volumetric ratio of the nanosilica dispersion to the alkanolamine activator is about 60:1.

In some embodiments, the nanosilica dispersion and alkanolamine activator LCM may include additional materials. For example, in some embodiment the nanosilica dispersion and alkanolamine activator LCM may include calcium carbonate particles, fibers (such as polyester fibers, polypropylene fibers, starch fibers, polyketone fibers, ceramic fibers, glass fibers or nylon fibers), mica, graphite, or combinations thereof.

In some embodiments, the nanosilica dispersion and alkanolamine activator LCM may be allowed to interact with the lost circulation zone for a period. For example, the period may be of sufficient duration to enable formation of a gelled solid as a result of the interaction between the nanosilica dispersion and the alkanolamine activator. The formed gelled solid may alter the lost circulation zone (for example, by entering and blocking porous and permeable paths, cracks, and fractures in a formation in the lost circulation zone, such as forming a structure in a mouth or within a fracture). In some embodiments, the formation of the gelled solid may include interaction with a carbonate formation in the lost circulation zone.

In some embodiments, the period may be in the range of about 0.5 hours to about 24 hours. In some embodiments, the period may be selected based on the formation type of the treatment zone. For example, in some embodiments the interaction period for a carbonate formation may be about 8 hours.

As shown supra, the nanosilica dispersion and alkanolamine activator may form a gelled solid LCM after a sufficient period. The alkanolamine activate may increase the rate of gelation of the nanosilica dispersion as compared to using the nanosilica dispersion alone as an LCM. In some embodiments, the gelling of the nanosilica dispersion may be controlled by varying the concentration of the alkanolamine activator, and the gelling may be controlled by changing the pH of the LCM. For example, increasing concentrations of the alkanolamine activator may increase the pH of the LCM and increase the rate of gelation of the LCM. Additionally, the alkanolamine activator exhibits no precipitation with the nanosilica dispersion at elevated temperature, thus enabling use of the LCM composition as a single fluid pill (that is, without staged mixing of each component). Consequently, the delayed and controlled gelling of the nanosilica dispersion LCM may provide for easier pumping of the LCM. The nanosilica dispersion and alkanolamine activator LCM may be used at elevated temperatures in a wellbore such as, for example, 100° F. or greater, such as 300° F. Moreover, the environmentally friendly properties of the nanosilica dispersion and alkanolamine activator LCM may minimize or prevent any environmental impact and effect on ecosystems, habitats, population, crops, and plants at or surrounding the drilling site where the nanosilica dispersion and alkanolamine activator LCM is used.

Nanosilica Dispersion Well Treatment Fluid

In some embodiments, a well treatment fluid for blocking excessive water production in a producing well in a carbonate formation includes a nanosilica dispersion. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion includes a stabilizer of acetic acid. In some embodiments, the nanosilica dispersion may be an acidic nanosilica dispersion and may have a pH of less than 7 before interaction with a formation. In some embodiments, the nanosilica dispersion has a pH in the range of 2 to 4 at 25° C., a specific gravity of 1.21 (g/ml) a viscosity of less than 30 cP at 25° C. In some embodiments, the nanosilica dispersion may be obtained from Evonik Corporation of Parsippany, N.J., USA.

In some embodiments, the nanosilica dispersion LCM may include additional materials. For example, in some embodiment the nanosilica dispersion LCM may include calcium carbonate particles, fibers (such as polyester fibers, polypropylene fibers, starch fibers, polyketone fibers, ceramic fibers, glass fibers or nylon fibers), mica, graphite, or combinations thereof.

In some embodiments, the nanosilica dispersion treatment fluid may be introduced into a treatment zone in a well, such as during a well treatment operation. For example, the nanosilica dispersion treatment fluid may be pumped through a wellhead at a pump rate sufficient to position the well treatment fluid at the treatment zone. In some embodiments, the nanosilica dispersion treatment fluid may be introduced using coiled tubing.

After introducing the nanosilica dispersion treatment fluid into the treatment zone, nanosilica dispersion may be allowed to interact with the treatment zone for a period. For example, the period may be of sufficient duration to enable the in-situ formation of a gelled solid as a result of the interaction between the nanosilica dispersion and the carbonate formation. The nanosilica dispersion treatment fluid may alter the treatment zone to reduce or block water production by reducing the permeability of flow paths in the formation (such as by forming a gelled solid in or at the mouth of permeable paths). In some embodiments, the period may be in the range of about 0.5 hours to about 24 hours.

In other embodiments, the nanosilica dispersion treatment fluid may be used in producing wells or injection wells. For example, the treatment zone may be a zone in a producing well. In some embodiments, the nanosilica dispersion treatment fluid may be used in combination with secondary and tertiary flooding operations, such as water flooding. For example, the nanosilica dispersion treatment fluid may be used to reduce or block flow of water or other fluid during secondary and tertiary flooding operations.

In some embodiments, the nanosilica dispersion treatment fluid may be used with one or more additional treatment fluids. For example, in some embodiments, an additional treatment fluid may be introduced into the treatment zone after introduction of the nanosilica dispersion treatment fluid and the elapse of the period for interaction between the nanosilica dispersion treatment fluid and the carbonate formation.

As shown supra, the nanosilica dispersion treatment fluid may form a gelled solid when in contact with calcium carbonate of a formation of a well. Upon introduction of the nanosilica dispersion with the carbonate formation, the pH of the nanosilica dispersion may increase (due to reaction of an acid of the dispersion with the carbonate formation) and become alkaline. Additionally, the delayed and controlled gelling of the nanosilica dispersion treatment fluid may provide for easier pumping of the treatment fluid and introduction into the treatment zone. The nanosilica dispersion treatment fluid may be used at elevated temperatures in a wellbore such as, for example, 100° F. or greater, such as 300° F. Moreover, the environmentally friendly properties of the nanosilica dispersion treatment fluid may minimize or prevent any environmental impact and effect on ecosystems, habitats, population, crops, and plants at or surrounding the production site where the nanosilica dispersion treatment fluid is used.

Nanosilica Dispersion and Alkanolamine Activator Well Treatment Fluid

In some embodiments, a well treatment fluid for blocking excessive water production in a producing well includes a nanosilica dispersion and an alkanolamine activator. In some embodiments, the nanosilica dispersion may include amorphous silicon dioxide in the range of about 5 w/w % to about 50 w/w %, glycerin in the range of about 3 w/w % to about 5 w/w %, and water in the range of about 50 w/w % to about 95 w/w %. In some embodiments, the nanosilica dispersion includes a stabilizer of acetic acid. In some embodiments, the nanosilica dispersion may be an acidic nanosilica dispersion and may have a pH of less than 7 before interaction with the activator. In some embodiments, the nanosilica dispersion has a pH in the range of 2 to 4 at 25° C., a specific gravity of 1.21 (g/ml) a viscosity of less than 30 cP at 25° C. In some embodiments, the nanosilica dispersion may be obtained from Evonik Corporation of Parsippany, N.J., USA.

In some embodiments, the alkanolamine activator may include monoethanolamine. In other embodiments, the alkanolamine activator may include other alkanolamines, such as diethanolamine, triethanolamine, and their derivatives. In some embodiments, the volumetric ratio of the nanosilica dispersion to the alkanolamine activator is 60:1.

In some embodiments, the nanosilica dispersion and alkanolamine activator may be mixed to form a treatment fluid before use in a well. The resulting treatment fluid may be introduced into a treatment zone in a well, such as during a well treatment operation. For example, the nanosilica dispersion and alkanolamine activator treatment fluid may be pumped through a wellhead at a pump rate sufficient to position the well treatment fluid at the treatment zone. In some embodiments, the nanosilica dispersion and alkanolamine activator treatment fluid may be introduced using coiled tubing. After introducing the nanosilica dispersion and alkanolamine activator treatment fluid into the treatment zone, the nanosilica dispersion and the alkanolamine activator may be allowed to interact with the treatment zone for a period. For example, the period may be of sufficient duration to enable the in-situ formation of a gelled solid as a result of the interaction between the nanosilica dispersion and the alkanolamine activator. The nanosilica dispersion and alkanolamine activator treatment fluid may alter the treatment zone to reduce or block water production by reducing the permeability of flow paths in the formation (such as by forming a gelled solid in or at the mouth of permeable paths).

In some embodiments, the interaction period may be in the range of about 0.5 hours to about 24 hours. In some embodiments, the period may be selected based on the formation type of the treatment zone. For example, in some embodiments the interaction period for a carbonate formation may be about 8 hours.

In some embodiments, the treatment fluid may be prepared at a well site, such as by mixing the nanosilica dispersion and alkanolamine activator to form the treatment fluid. The nanosilica dispersion and alkanolamine activator treatment fluid may be used in producing wells or injection wells. For example, the treatment zone may be a zone in a producing well. In some embodiments, the nanosilica dispersion and alkanolamine activator treatment fluid may be used in combination with secondary and tertiary flooding operations, such as water flooding. For example, the nanosilica dispersion treatment and alkanolamine activator fluid may be used to reduce or block flow of water or other fluid during secondary and tertiary flooding operations.

In some embodiments, the acidic nanosilica and alkanolamine activator dispersion treatment fluid may be used with one or more additional treatment fluids. For example, in some embodiments, an additional treatment fluid may be introduced into the treatment zone after introduction of the nanosilica dispersion and alkanolamine activator treatment fluid and the elapse of a period for interaction between the nanosilica dispersion and the alkanolamine activator of the treatment fluid.

As shown supra, the nanosilica dispersion and alkanolamine activator may form a gelled solid after a sufficient period. The alkanolamine activate may increase the rate of gelation of the nanosilica dispersion as compared to using the nanosilica dispersion alone as a well treatment. In some embodiments, the gelling of the nanosilica dispersion may be controller by varying the concentration of the alkanolamine activator, and the gelling may be controlled by changing the pH of the treatment fluid. For example, increasing concentrations of the alkanolamine activator may increase the pH of the treatment fluid and increase the rate of gelation of the treatment fluid. Additionally, the alkanolamine activator exhibits no precipitation with the nanosilica dispersion at elevated temperature, thus enabling use of the treatment fluid as a single fluid without staged mixing of each component. Consequently, the delayed and controlled gelling of the nanosilica dispersion and alkanolamine activator treatment fluid may provide for easier pumping of the treatment fluid after mixing at the surface and before introduction to the treatment zone. The nanosilica dispersion and alkanolamine activator treatment fluid may be used at elevated temperatures in a wellbore such as, for example, 100° F. or greater, such as 300° F. Moreover, the environmentally friendly properties of the nanosilica dispersion and alkanolamine activator treatment fluid may minimize or prevent any environmental impact and effect on ecosystems, habitats, population, crops, and plants at or surrounding the drilling site where the nanosilica dispersion and alkanolamine activator treatment fluid is used.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure The following non-limiting example of an acidic nanosilica dispersion was tested in combination with calcium carbonate to simulate the contact of the nanosilica dispersion when pumped into a carbonate formation.

The acidic nanosilica dispersion used was IDISIL® LPH 35 manufactured by Evonik Corporation of Parsippany, N.J., USA. The properties of the nanosilica dispersion are described in Table 1:

TABLE 1

| Properties of Nanosilica Dispersion Nanosilica dispersion | |
|---|---|
| pH @ 25° C. | 2-4 |
| Specific Gravity (grams/milliliter (g/ml)) | 1.2 |
| Viscosity @ 25° C. (cP) | <30 |
| Stabilizer | Acetic Acid |
| Visual Appearance | White/Off White |
| Freezing Point | 0° C. |
| Boiling point | 100° C. |
| Relative Density | 1.160-1.225 |

The acidic nanosilica dispersion was a milky liquid that was completely miscible in water and had the same evaporation rate as water.

In a first experiment, 90 milliliters (ml) of the acidic nanosilica dispersion was added to an empty beaker. The initial pH of the acidic nanosilica dispersion was measured to be 3.6. Next, 20 grams (g) of calcium carbonate was added to the acidic nanosilica dispersion with constant stirring. The calcium carbonate was in powder form having an average particle size of 50 microns. The resultant pH of the nanosilica dispersion after the addition of 20 g of calcium carbonate was measured to be 6.5.

Next, the mixture of the nanosilica dispersion with the added calcium carbonate was plated in a high temperature and high pressure (HTHP) aging cell. The cell was static aged for 16 hours at 300° F. to simulate downhole conditions.

After 16 hours of static aging at 300° F., the mixture of the nanosilica dispersion with the added calcium carbonate was converted into gelled solid. FIG. 1 is a photograph 100 of the gelled solid formed by the mixture of the nanosilica dispersion with the added calcium carbonate. The formation of the gelled solid after static aging at the elevated temperature of 300° F. shows that the acidic nanosilica dispersion can behave as an LCM when introduced into carbonate formations.

In a second experiment, 90 milliliters (ml) of the acidic nanosilica dispersion was added to an empty beaker. Next, 10 grams (g) of calcium carbonate was added to the acidic nanosilica dispersion with constant stirring. Next, 0.5 ml of monoethanolamine was added to the mixture of the acidic nanosilica dispersion and calcium carbonate.

The mixture of the nanosilica dispersion with the added calcium carbonate and monoethanolamine was placed in a high temperature and high pressure (HTHP) aging cell. The cell was static aged for 8 hours at 300° F. to simulate downhole conditions.

Figure 2:
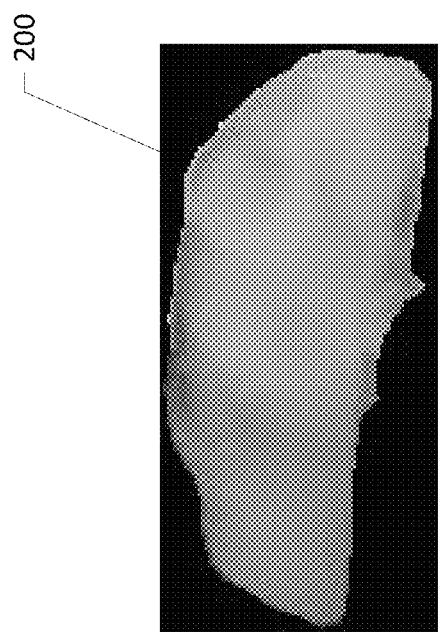
FIG. 2 is a photograph of a gelled solid formed by a mixture of a nanosilica dispersion with a monoethanolamine activator and added calcium carbonate in accordance with an embodiment of the disclosure.

After 8 hours of static aging at 300° F., the mixture of the nanosilica dispersion with the added calcium carbonate and monoethanolamine was converted into a gelled solid. FIG. 2 is a photograph 200 of the gelled solid formed by the mixture of the nanosilica dispersion with the added calcium carbonate and monoethanolamine. The formation of the gelled solid after static aging at the elevated temperature of 300° F. shows that the acidic nanosilica dispersion can behave as an LCM when introduced into carbonate formations and further shows that the addition of an alkanolamine activator (for example, monoethanolamine) hastens the rate of formation of the gelled solid (that is, the addition of monoethanolamine reduces the period for formation of the gelled solid).

In a third experiment, 120 ml of the acidic nanosilica dispersion was added to an empty beaker. The initial pH of the acidic nanosilica dispersion was measured to be 3.6. Next, 2 ml of monoethanolamine was added to the acidic nanosilica dispersion with constant stirring. The resultant pH of the nanosilica dispersion after the addition of 2 ml of monoethanolamine was measured to be 9.28.

The mixture of the nanosilica dispersion with monoethanolamine and was placed in a high temperature and high pressure (HTHP) aging cell. The cell was placed in an oven and static aged for 16 hours at 300° F. to simulate downhole conditions.

Figure 3:
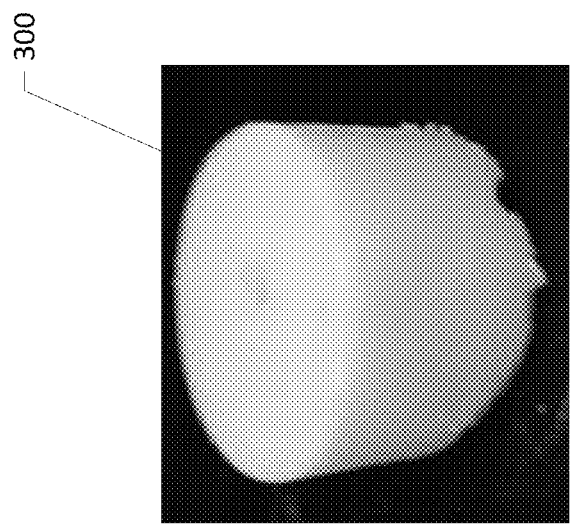
FIG. 3 is a photograph of a gelled solid formed by a mixture of a nanosilica dispersion and a monoethanolamine activator in accordance with an embodiment of the disclosure.

After 16 hours of static aging at 300° F., the mixture of the nanosilica dispersion with the added monoethanolamine was converted into a gelled solid. FIG. 3 is a photograph 300 of the gelled solid formed by the mixture of the nanosilica dispersion with the added monoethanolamine. The formation of the gelled solid after static aging at the elevated temperature of 300° F. shows that the acidic nanosilica dispersion can be used as a treatment fluid to reduce or block excessive water production during the production of oil or gas from a well.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to reduce water production in a treatment zone in carbonate formation, consisting of:
    introducing a treatment fluid into the wellbore such that the treatment fluid contacts the treatment zone and reduces the water production in the treatment zone, wherein the treatment fluid consists of an acidic nanosilica dispersion, the acidic nanosilica dispersion consisting of amorphous silicon dioxide, water, and acetic acid,
    wherein the acidic nanosilica dispersion comprises an initial pH in the range of 2 to 4 before introducing the treatment fluid into the wellbore and an increased pH after the treatment fluid contacts the treatment zone in the carbonate formation,
    wherein the treatment fluid forms a gelled solid after contact with the treatment zone in the carbonate formation for a contact period in the range of 0.5 hours to 24 hours.

2. The method of claim 1, wherein the acidic nanosilica dispersion comprises amorphous silicon dioxide in the range of 5 weight percentage of the total weight (w/w %) to about 50 w/w %.

3. The method of claim 2, wherein the acidic nanosilica dispersion comprises water in the range of 50 w/w % to 95 w/w %.

4. The method of claim 1, wherein the acidic nanosilica dispersion comprises a pH of 6.5 after the treatment fluid contacts the treatment zone in the carbonate formation.

5. A method to reduce water production in a treatment zone in carbonate formation, consisting of:
    introducing a treatment fluid into the wellbore such that the treatment fluid contacts the treatment zone and reduces the water production in the treatment zone, wherein the treatment fluid consists of an acidic nanosilica dispersion and at least one of: calcium carbonate particles, fibers, mica, and graphite, the acidic nanosilica dispersion consisting of amorphous silicon dioxide, water, and acetic acid,
    wherein the acidic nanosilica dispersion comprises an initial pH in the range of 2 to 4 before introducing the treatment fluid into the wellbore and an increased pH after the treatment fluid contacts the treatment zone in the carbonate formation,
    wherein the treatment fluid forms a gelled solid after contact with the treatment zone in the carbonate formation for a contact period in the range of 0.5 hours to 24 hours.

6. The method of claim 5, wherein the fibers comprise at least one of: polyester fibers, polypropylene fibers, starch fibers, polyketone fibers, ceramic fibers, glass fibers or nylon fibers.

* * * * *